United States Patent [19]

Hagberg

[11] 4,326,354
[45] Apr. 27, 1982

[54] RECREATIONAL KIT FOR CONSTRUCTING OBJECTS

[76] Inventor: Carl E. Hagberg, Sandelsgaten 37, S-115 33 Stockholm, Sweden

[21] Appl. No.: 140,309

[22] Filed: Apr. 14, 1980

Related U.S. Application Data

[63] Continuation of Ser. No. 888,645, Mar. 21, 1978, abandoned.

[30] Foreign Application Priority Data

Mar. 24, 1977 [SE] Sweden .................. 7703359

[51] Int. Cl.³ .............. A63H 33/10; A63H 33/04; B25G 3/28; B25G 3/00
[52] U.S. Cl. .......................... 46/26; 46/24; 403/263; 403/282
[58] Field of Search ............ 46/16, 17, 23, 24, 25–29; 35/27; 403/263, 282, 334; 16/110 R

[56] References Cited

U.S. PATENT DOCUMENTS

| 2,709,318 | 5/1955 | Benjamin | 46/23 |
| 2,803,088 | 8/1957 | Swann | 46/17 |
| 2,843,971 | 7/1958 | Gardellin | 46/29 X |
| 3,681,870 | 8/1972 | Alpert | 46/26 |
| 3,706,473 | 12/1972 | Mullen | 46/29 X |

FOREIGN PATENT DOCUMENTS

| 2305066 | 8/1974 | Fed. Rep. of Germany | 46/16 |
| 886861 | 7/1943 | France | 46/29 |

Primary Examiner—Gene Mancene
Assistant Examiner—Michael J. Foycik, Jr.
Attorney, Agent, or Firm—Jon Lewis

[57] ABSTRACT

This invention discloses a kit for assembling light, airy, toy-like designs from blocks and solid sticks made of the same material throughout. The blocks preferably have tapered holes adapted to receive the sticks' ends therein. The holes and the sticks are adapted to compressively engage with one another upon insertion of selected ends of the sticks in the holes, thereby providing a secure grip by each hole's wall upon the end of the associated stick, locking it into the hole.

39 Claims, 13 Drawing Figures

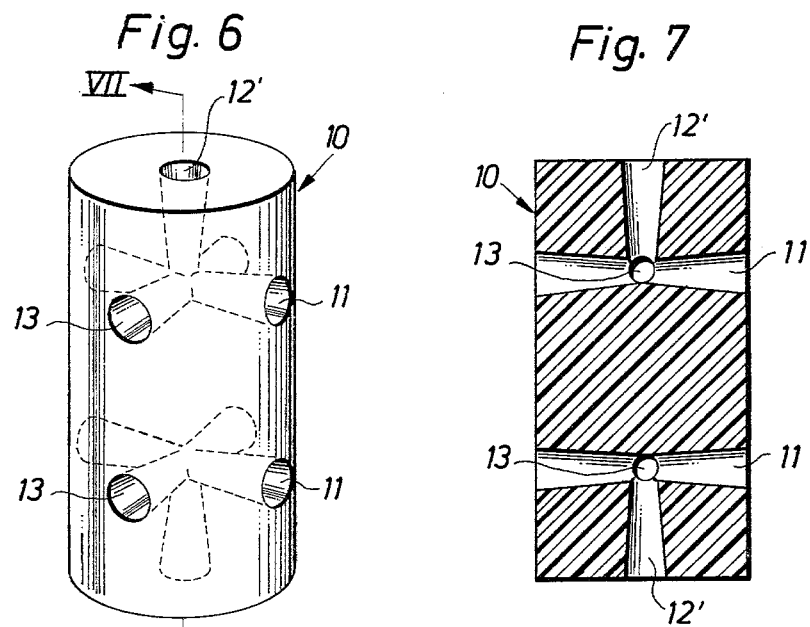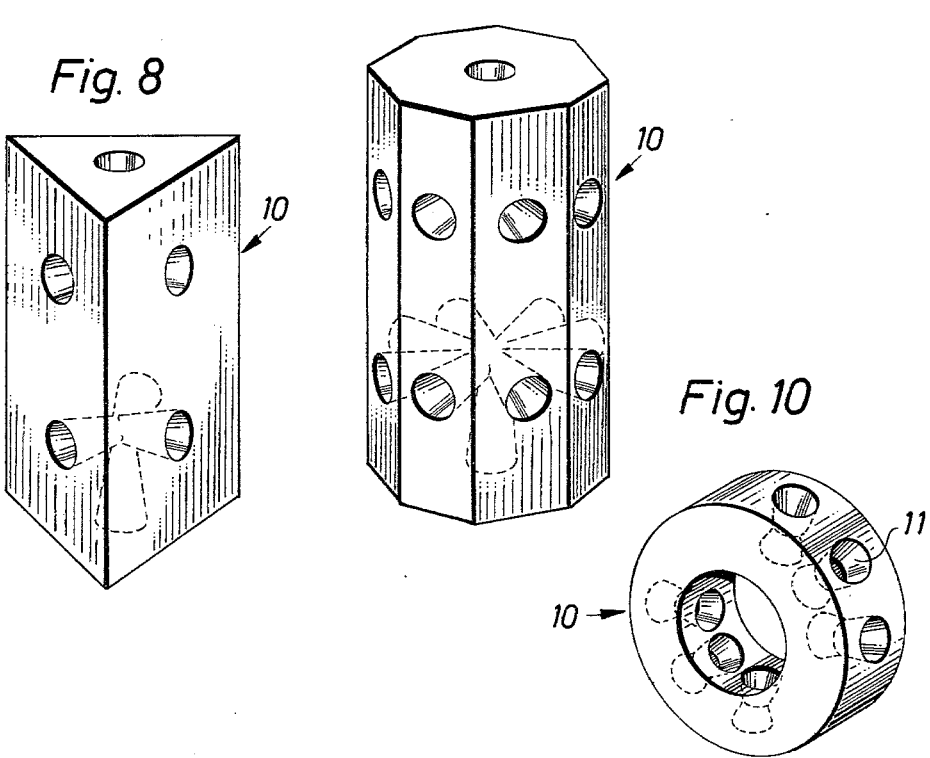

RECREATIONAL KIT FOR CONSTRUCTING OBJECTS

This is a continuation of prior U.S. Application Ser. No. 888,645, filed Mar. 21, 1978 and now abandoned.

BACKGROUND OF THE INVENTION

This invention relates generally to recreational kits and more particularly to kits for building toy-like objects of selectable configuration.

DESCRIPTION OF PRIOR ART

It is known that numbers of different kits for passing the time exist. The features for the known kits are that all the individual pieces for assembly included therein are more or less precision manufactured, thereby making them relatively expensive and sensitive to wear.

In order to reduce this problem of wear, to which the individual component pieces are exposed, often under the rather rough use which the clientel prefers, the component parts in the prior art systems are manufactured of sturdy wear-resistant material such as solely hard plastic material, or certain pieces made of hard plastic and others of metal.

The two requirements, accurate and precise manufacturing and wear-resistant material, mean that the costs of manufacture and the purchase price remain high.

The previously known systems provide indeed a certain freedom for creative designs, but normally the modular pieces which are provided in kits are intended to provide usually one or, in the most desirable case, a few predetermined final configurations. The games and designs therefore become often solely an assembly exercise following predetermined plans.

The component parts of the previously known kits are usually made in modules. While this affords some inherent flexibility, there is only a limited possibility for the user to be able to modify the magnitude or proportions of the component parts on the final design.

An example of a prior art kit can be seen in U.S. Pat. No. 3,681,870 wherein a series of giant size, hollow construction blocks which are made from plastic formed in special molds are shown. These blocks are connectable by the use of flexible straps in order to form substantially solid-looking structures. The blocks have reinforcing struts therein. These reinforcing struts have a taper associated therewith which has the purpose of facilitating the removal of the blocks from the molds utilized in their making and also the taper has the purpose of enhancing the strength of the block structure. The flexible straps have projections or bosses projecting therefrom which are inserted into the reinforcing struts to hold them together after assembly by a child or other user. In order that the bosses or projections fit properly into the interior of the reinforcing struts, the bosses have a shape which conforms to the shape of the interior of the struts.

An example of a non-analogous art prior kit is shown in French Pat. No. 2,229,203 for making usable objects rather than toy-like designs which are used principally for passing the time. The objects taught by the French Patent are very strong, having components made of strong plastic or metal nad having a permanent quality which allows them to be used by the assembler on a long-term basis as furniture, among other things. This patent utilizes long cylindrical rods to interconnect with cylindrical holes in connecting blocks. This kit is very expensive to manufacture since the strength is required to provide usable end products.

To make an end product quickly, having large proportions, is attractive to most children. For this purpose, in the prior art systems, very large component parts are provided, but the degrees of freedom which are thus available with these parts are rather limited.

The aforementioned disadvantages of the prior art systems show that a need exists for a more suitable recreational kit, and a purpose of the present invention is, therefore, to eliminate the aforesaid flaws of the previously known kits.

SUMMARY OF THE INVENTION

The present invention provides a kit for assembling a myriad of different imaginative designs. The kit provides a user with recreation by permitting the assembly of light and airy geometric configurations. A user assembles a series of blocks having holes which have larger cross-sectional areas at the surface of the associated block then in the interior portion of the hole, which assembly is achieved by inserting connecting elements into the holes and thereby creating an intricate design. The ends of the connecting elements are compressively held in the associated hole by the action of the variation in the cross-section providing force at the points of contact by each hole and its associated connecting element. The ends of the connecting element are preferably deformed by these forces, thereby providing a structure which is relatively strong when subjected to handling.

A portion of the holes in the blocks preferably go clear through and the cross sectional areas of each hole increase preferably substantially uniformly in both directions away from a region disposed substantially in between the apertures of the hole in the block.

The blocks are preferably made of a plastic material and the connecting elements are made of wood or a similar relatively soft material.

As the connecting elements, wooden sticks can preferably be used which have a substantially square cross section, and the holes are preferably shaped to be substantially conical reckoned from the region disposed between the apertures of the holes.

The taper of said holes and the cross section of each stick can be provided with such a mutual relationship, that a stick through deformation of its cross section becomes insertable approximately close to said region or alternatively past this region and out through the other end of the unobstructed hole.

BRIEF DESCRIPTION OF THE DRAWINGS

FIGS. 6 and 7 show a cylindrical modular body in a schematic perspective drawing and a sectional drawing respectively along the line VII—VII of FIG. 6.

FIGS. 8–10 are schematic perspective views of alternative embodiments of the modular bodies.

DESCRIPTION OF THE PREFERRED EMBODIMENT

Figure 1:
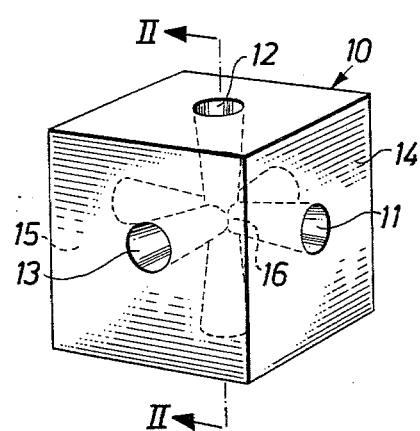
FIG. 1 shows a cube type modular body according to the invention.

In the drawings, notation 10 has been used generally to denote a plurality of embodiments of the modular bodies. In FIG. 1, the modular body has a cubic shape, and each pair of opposite sides are connected by holes 11, 12 and 13 which extend completely through the body. The hole 11 connects the sides 14 and 15 of the body 10. From each and every of these sides, a hole 11 extends substantially through the central point 16 of the body 10. As seen from each of sides 14 and 15 the hole 11 is tapered and narrows towards the central point 16. The other holes 12 and 13 are identical to hole 11.

Figure 2:
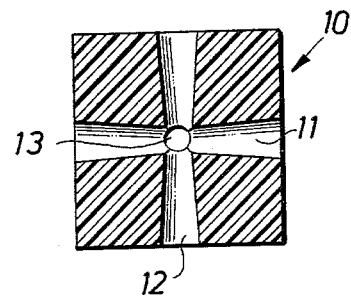
FIG. 2 is a sectional view along the line II—II of FIG. 1.
Figure 3:
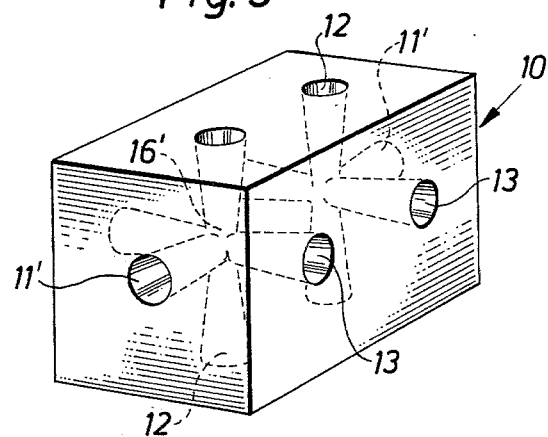
FIG. 3 shows a parallelopiped type modular body.

In the parallelopiped form of the embodiment of FIG. 3, in a corresponding manner similar to that in the embodiment of FIGS. 1 and 2, the holes 12 and 13 are through holes, while the hole 11 is replaced by a hole 11', which extends to the intersection of the holes 12 and 13. This in FIG. 3 has been denoted with 16' and corresponds thus theoretically to the point of intersection 16 in FIGS. 1 and 2. The modular body of FIG. 3 preferably has a depth twice as great as the sides of the cube of FIG. 1. The height of the parallelopiped type body of FIG. 3 is thus preferably equal to the length of side of the cube.

Figure 4:
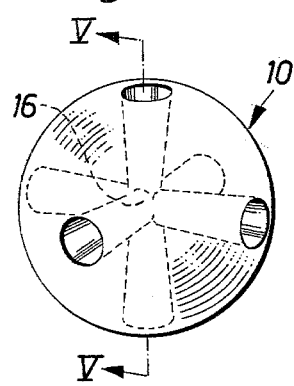
FIGS. 4 and 5 show a spherical modular body in a schematic perspective view and sectional views respectively along the line V—V of FIG. 4.
Figure 5:
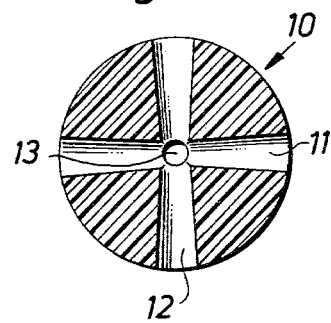

The spherical embodiment according to FIGS. 4 and 5 have in theory the same type of hole placement as that of the cube in FIGS. 1 and 2.

The cylindrical embodiment of FIGS. 6 and 7 is a modular body theoretically corresponding to the parallelopiped type body of FIG. 3. The holes 11 and 13 in the cylindrical modular body's outer surface opening extend radially with respect to the principal axis of the cylinder and have equal mutual angles of intersection between them.

As can be seen from FIGS. 8 and 9, the angular relationship between the through holes is variable in a desired manner by using a prismatic body for the modular body. FIG. 8 shows therefore a prismatic body with a triangular cross section while the prism of FIG. 9 has an orthogonal cross section.

In order that in combination with a cylindrical modular body of the essential type which is shown in FIG. 6 in order to be able to unite the bodies radially, modular bodies of the essential type which are shown in FIG. 10 could even be considered. This body is annular in shape and has radial through holes 11. As suggested in FIG. 10, the holes 11 may have essentially the same configuration as the holes in the earlier embodiments.

Figure 12:
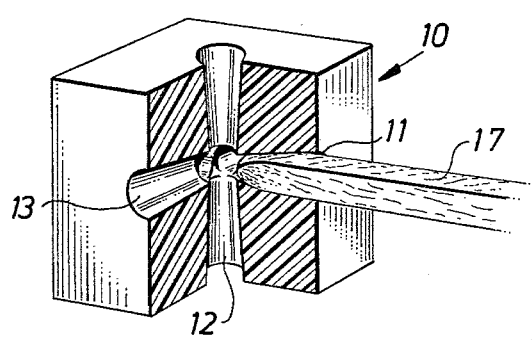
FIG. 12 shows partially in section how a connecting element is introduced in the hole in a body such that the connecting element gets deformed, thereby locking it into the hole.
Figure 13:
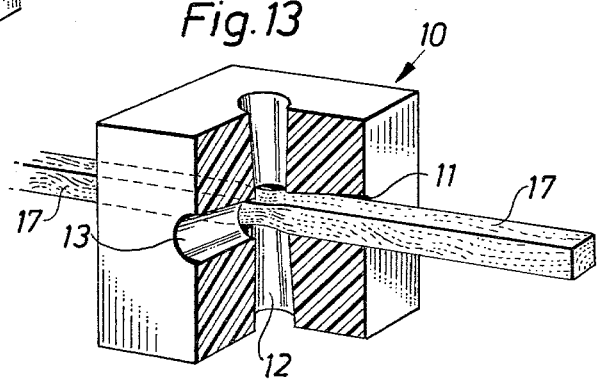
FIG. 13 shows an embodiment where the connecting element is introduced right through the hole such that the connecting element is deformed and said is locked into the hole.

In FIGS. 12 and 13 are shown connecting elements 17 provided for connecting the modular bodies. Connecting elements 17 comprise sticks made of wood or a similar relatively soft material. As shown in these figures, these sticks 17 have preferably square or rectangular cross sections and may preferably be comprised of so-called unprocessed matches. The modular bodies 10 are, however, made of relatively harder material, for example, plastic. In this fashion, there do not exist any significant difficulties in providing the contemplated taper in the holes in the bodies.

It is possible to choose this taper in various ways. The taper shown in FIG. 12 is relatively steep. With such a taper the sticks 17 are able to be passed through the intersection point of the holes and through the body without any problem. It will be held in the hole even before or approximately at the point of intersection and by deformation through the action of friction, is held in the hole.

However, as is evident from FIG. 13, the taper of the holes may be so adapted that it is possible to push the stick clear through a hole so that it protrudes from the body's opposite side.

The sticks 17, which are used for the connection of the modular bodies one to the other, are as previously stated, relatively soft. After a stick has been used for making a connection, a certain deformation is formed on the end of the stick thus utilized, but since the holes have a progressively diminishing cross sectional area as they go into the body, as shown in the drawing, this has no significance in a subsequent use of said sticks. The sticks can simply be pushed a short distance further into the narrowest end of the hole and still provide the same interlocking through deformation and frictional contact. This is especially the case relating to the embodiment as shown in FIG. 12.

Figure 11:
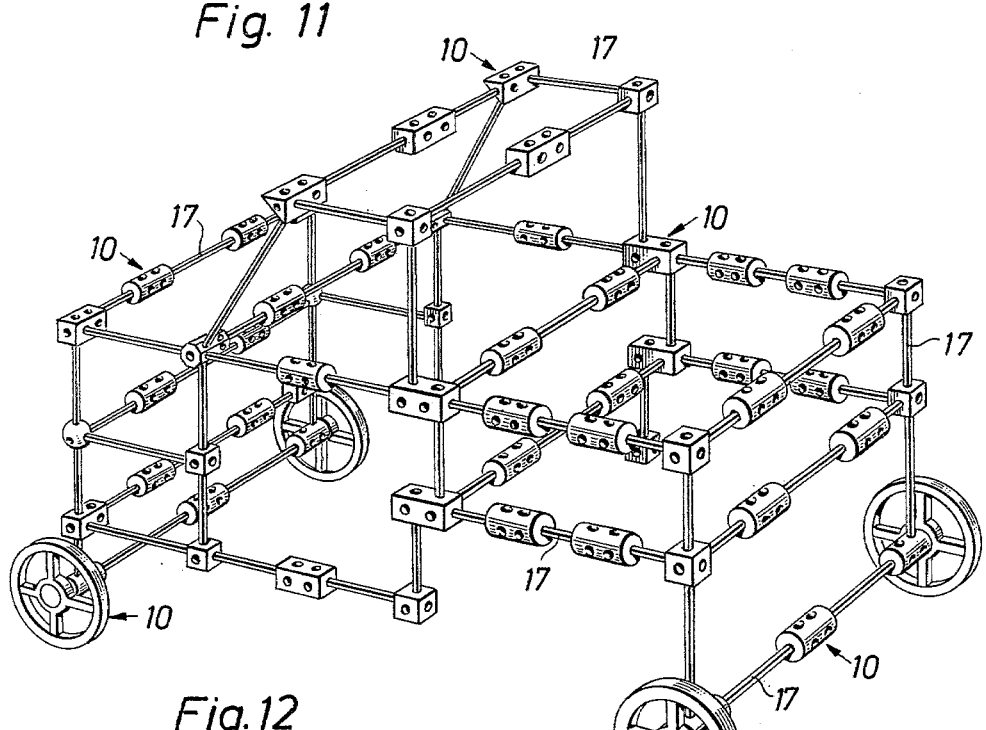
FIG. 11 shows schematically how the modular bodies and the connecting elements can be used for creative designs.

The modular bodies and the sticks provide almost inexhaustible numbers of design possibilities. In FIG. 11 is shown schematically how one, for example, with the aid of modular bodies and sticks can achieve a truck-like creation. Since one is able without difficulty to break the sticks off to desired lengths, one has very great possibilities to allow one's imagination to run free in the making of possible connections of the modular bodies. The design one attains becomes airy and light and should one of the sticks break, this does not make any difference, since they do not comprise an expensive component in the modular system.

There has thus been described a plurality of different modular bodies and configurations of holes therein. It is to be understood thus, that variational possibilities are very great while still keeping within the fundamental concept as presented in the claims. The object is therefore, that the concept of the invention shall not be limited to the specification and the shown embodiments, but the invention shall be obviously only limited as presented in the claims.

What is claimed is:

1. A kit for recreational purposes for the building of at least user designable objects comprising toy-like configurations having at least one geometrically selectable shape, said kit comprising:

a plurality of blocks having exterior surfaces, each of said exterior surfaces having at least an extreme outer surface portion, a central region circumscribed by said extreme outer surface portion; at least one aperture on the exterior surface of each of said blocks, said at least one aperture defining a hole, said hole having a substantially central longitudinal axis extending substantially immediately from said outer surface generally toward said central region, said hole having varying cross-sectional area which decreases from said exterior surface towards said central region progressively along at least a portion of the length of said longitudinal axis, and a plurality of elongated elements being hand-breakable by the user into desired lengths, and formed of substantially a deformable material throughout and having ends which have a non-mating cross-section adapted to be insertable into the holes in said blocks at least for inter-connecting a selectable portion of said blocks one with the other, said hole having such a profile with respect to said cross-section of the elongated elements that a selectable end of each said elongated elements is compressibly grippable by deformation in and by a corresponding hole, at one of at least several locations along said portion of decreasing cross-sectional area of the hole.

2. The kit according to claim 1 wherein said elongated elements are easily changeable, at least said ends of said elongated elements are deformable, and whereby the selectable end is deformed upon insertion into its corresponding hole and gripped thereby.

3. The kit according to claim 1 wherein said variation in cross-sectional area of said hole increases substantially uniformly along said substantially longitudinal axis from one end to the other of said hole.

4. The kit according to claim 2 wherein said variation in cross-sectional area of said hole increases substantially uniformly along said substantially longitudinal axis from one end to the other of said hole.

5. The kit according to claim 3 wherein said variation in cross-sectional area is generated by a substantially conical taper of said hole.

6. The kit according to claim 4 wherein said variation in cross-sectional area is generated by a substantially conical taper of said hole.

7. The kit according to claim 1 wherein one of said blocks has at least two holes therein, and wherein the longitudinal axis of a first of said holes is substantially aligned with the longitudinal axis of a second of said holes.

8. The kit according to claim 3 wherein one of said blocks has at least two holes therein, and wherein the longitudinal axis of a first of said holes is substantially aligned with the longitudinal axis of a second of said holes.

9. The kit according to claim 6 wherein one of said blocks has at least two holes therein, and wherein the longitudinal axis of a first of said holes is substantially aligned with the longitudinal axis of a second of said holes.

10. The kit according to claim 7 wherein the axes of said first and second holes are substantially aligned, providing a through-going composite hole extending through at least a portion of the block associated therewith.

11. The kit according to claim 8 wherein the axes of said first and second holes are substantially aligned, providing a through-going composite hole extending through at least a portion of the block associated therewith.

12. The kit according to claim 9 wherein the axes of said first and second holes are substantially aligned, providing a through-going composite hole extending through at least a portion of the block associated therewith.

13. The kit according to claim 1 wherein said elongated elements are user-dividable into selectable lengths.

14. The kit according to claim 2 wherein said elongated elements are user-dividable into selectable lengths.

15. The kit according to claim 1 wherein said elongated elements are solid.

16. The kit according to claim 13 wherein said elongated elements are solid.

17. The kit according to claim 12 wherein said elongated elements are solid.

18. The kit according to claim 17 wherein said connecting elements have substantial uniform cross-sectional areas from one end to the other.

19. The kit according to claim 1 wherein said blocks are made of plastic material and said connecting elements of a relatively soft, deformable material.

20. The kit according to claim 19 wherein said relatively soft deformable material comprises wood.

21. The kit according to claim 1 wherein the variation and cross-sectional areas of said holes and the cross-sections of said connecting elements have a mutual relationship that on insertion the cross-section of the connecting element is deformed such that the connecting element is insertable substantially up to the smallest cross-sectional area of the corresponding hole.

22. The kit according to claim 9 wherein the variation and cross-sectional areas of said holes and the cross-sections of said connecting elements have a mutual relationship that on insertion the cross-section of the connecting element is deformed such that the connecting element is insertable substantially up to the smallest cross-sectional area of the corresponding hole.

23. The kit according to claim 11 wherein the variation and cross-sectional areas of said holes and the cross-sections of said connecting elements have a mutual relationship that on insertion the cross-section of the connecting element is deformed such that the connecting element is insertable substantially up to the smallest cross-sectional area of the corresponding hole.

24. The kit according to claim 18 wherein the variation and cross-sectional areas of said holes and the cross-sections of said connecting elements have a mutual relationship that on insertion the cross-section of the connecting element is deformed such that the connecting element is insertable substantially up to the smallest cross-sectional area of the corresponding hole.

25. The kit according to claim 12 wherein the variation in the cross-sectional area of the through-going composite holes and the cross-section of each connecting element have a mutual relationship that by deformation of the cross-sectional area of the connecting element, the connecting element becomes insertable past the smallest cross-sectional area of the through-going corresponding hole and out through the other open aperture of the through-going corresponding hole.

26. The kit according to claim 15 wherein the variation in the cross-sectional area of the through-going composite holes and the cross-section of each connecting element have a mutual relationship that by deformation of the cross-sectional area of the connecting element, the connecting element becomes insertable past the smallest cross-sectional area of the through-going corresponding hole and out through the other open aperture of the through-going corresponding hole.

27. The kit according to claim 17 wherein the variation in the cross-sectional area of the through-going composite holes and the cross-section of each connecting element have a mutual relationship that by deformation of the cross-sectional area of the connecting element, the connecting element becomes insertable past the smallest cross-sectional area of the through-going corresponding hole and out through the other open aperture of the through-going corresponding hole.

28. The kit according to claim 18 wherein the variation in the cross-sectional area of the through-going composite holes and the cross-section of each connecting element have a mutual relationship that by deformation of the cross-sectional area of the connecting element, the connecting element becomes insertable past the smallest cross-sectional area of the through-going corresponding hole and out through the other open aperture of the through-going corresponding hole.

29. A kit for recreational and educational purposes for building toy-like structures having user-selectable shapes, said kit comprising:

blocks having optional shapes, said blocks having through-going holes along predetermined longitudinal axes, said holes each having at least two openings onto at least one exterior surface of each of said blocks, said holes extending from said at least one surface of each of said blocks, said holes having a varying cross-sectional area which decreases from said exterior surface towards an inside region of the block, the decrease being progressive along a substantial length of said longitudinal axis, and deformable solid elongated connecting elements being easily hand dividable by a user into desired lengths, and wherein used tips of elements can be broken off by hand, the connecting elements having ends with such a non-mating cross-sectional area relative to the hole-cross-section that they are insertable into said holes for connecting together said blocks whereby the inserted connecting element is compressibly gripped by deformation in the hole being inserted into.

30. A kit for recreational purposes for building toy-like structures comprising:

a plurality of plastic blocks having conically tapered holes disposed therein, said holes having a greater diameter at a surface of said block and a smaller diameter within said block; and wooden match sticks which are substantially softer than said plastic blocks and hand-dividable by the user into desired lengths and having a longitudinal axis from one end to the other, said wooden sticks having substantially a square homogenous cross-sectional area substantially perpendicular to said longitudinal axis, said wooden sticks being deformable by insertion into one of said holes, such that each wooden stick is deformed by and gripped in the conical taper of its associated hole.

31. A kit for recreational purposes for the building of at least user designable objects comprising toy-like configurations having at least one geometrically selectable shape, said kit comprising:

a plurality of blocks having exterior surfaces, each of said exterior surfaces having at least an extreme outer surface portion, a central region circumscribed by said extreme outer surface portion; at least one aperture on the exterior surface of each of said blocks, said at least one aperture defining a hole, said hole having a substantially central longitudinal axis extending substantially immediately from said outer surface generally toward said central region, said hole having a varying cross-sectional area which decreases from said outer surface towards said central region, the decrease of cross-sectional area being progressive along a substantial length of said longitudinal axis; and a plurality of elongated elements which are hand-dividable by the user into desired lengths being formed of a deformable material and having ends adapted to be insertable into the holes in said blocks at least for interconnecting a selectable portion of said blocks one with the other, the elongated elements having such a non-mating cross-sectional area relative to the hole cross-section that a selectable end of each of said elongated elements is compressibly grippable by deformation in and by its corresponding hole.

32. A kit for recreational purposes for the building of at least user designable objects comprising toy-like configurations having at least one geometrically selectable shape, said kit comprising:

a plurality of blocks having exterior surfaces, each of said exterior surfaces having at least an extreme outer surface portion, a central region circumscribed by said extreme outer surface portion; at least one aperture on the exterior surface of each of said blocks, said at least one aperture defining a hole, said hole extending substantially immediately from said exterior surface, each said hole having a cross-sectional area which decreases from said exterior surface towards said central region progressively over a length of the hole; and a plurality of easily hand-dividable elongated elements being formed of material substantially softer than the blocks and having a cross-section dissimilar to that of said holes and having ends which after use can be broken off by hand before insertion into the holes in said blocks one with the other, whereby the end of an elongated element can be gripped in a corresponding hole by compressive deformation.

33. A kit for recreational purposes for the building of at least user designable objects comprising toy-like configurations having at least one geometrically selectable shape, said kit comprising:

a plurality of blocks having exterior surfaces, each of said exterior surfaces having at least an extreme outer surface portion, a central region circumscribed by said extreme outer surface portion; at least one aperture on the exterior surface of each of said blocks, said at least one aperture defining a hole, said hole extending substantially immediately from said external surface, each said hole having a cross-sectional area which decreases from said exterior surface towards said central region progressively over a length of the hole, and a plurality of easily hand-dividable elongated elements being formed of material substantially softer than said blocks and having ends which after use can be broken off by hand before insertion into the holes in said blocks at least for interconnecting a selectable portion of said blocks one with the other, cross-sections of said holes and said ends of the elements being non-mating and mutually adapted such that upon insertion of an end of an element into its corresponding hole, said end of said element is deformed by said hole and gripped thereby.

34. In a toy kit for building user designable configurations of the type comprising a plurality of blocks, each block having several holes with predetermined cross-section and directed inwardly of each block and a plurality of rod-like elements which can be inserted in the holes for assembling the blocks and rods to obtain a desired configuration, the improvement comprising:

said holes in each block being tapered to converge inwardly of said each block, said rod-like elements being of soft deformable material and having ends with cross-sections which are non-mating with respect to the cross-sections of the holes, said rod-like elements being hand-dividable by user into desired lengths.

35. A recreational toy kit for building user designable configurations, comprising: a plurality of plastic blocks, each block having a plurality of holes extending from the block exterior to the block interior, each hole having a predetermined cross-section and converging towards the block interior, and a plurality of soft wood rod elements being hand breakable by user into desired lengths and having ends with a cross-section which is dissimilar to and non-mating with respect to said predetermined cross-section of the holes, the non-mating cross-section of the rod ends being so as to permit assembly in one of the holes of a said plastic block.

36. A recreational toy kit as in claim 35 wherein the holes have each a cross-section which is at least partly circular whereby the convergent holes are substantially of truncated conical shape and wherein said soft wood rod elements comprise unprocessed rejected wooden matchsticks which are of substantially a rectangular cross-section, and which are hand dividable by a user into desired lengths for use.

37. A recreational toy kit as in claim 36 wherein at least two holes in at least some blocks are co-axially aligned and have a through bore joining the two holes, so that a rod element can be inserted completely past one of said two aligned holes.

38. A recreational toy kit as in claim 37 wherein the lengths of the soft wood rod elements are slim enough so that a user can break off the tips of the rod elements by hand after use once, so that the rod elements can be reused.

39. A recreational toy kit as in claim 35 wherein the hole cross-section is at least partly circular.

* * * * *